United States Patent [19]

Dimitracopoulos

[11] 3,827,794

[45] Aug. 6, 1974

[54] AUDIOVISUAL DISC PROJECTOR

[76] Inventor: Panayotis C. Dimitracopoulos, P.O. Box 458, Montreal, Quebec, Canada

[22] Filed: Nov. 6, 1972

[21] Appl. No.: 304,202

[52] U.S. Cl. ..................... 353/18, 274/9 C, 353/19
[51] Int. Cl. ..................... G03b 31/06, G11b 3/40
[58] Field of Search ..................... 353/15–19; 274/9 C

[56] References Cited

UNITED STATES PATENTS

| | | | |
|---|---|---|---|
| 3,389,636 | 6/1968 | Weitzner et al. | 353/19 |
| 3,583,808 | 6/1971 | Glass et al. | 353/15 |
| 3,720,005 | 3/1973 | Roche | 353/19 |

*Primary Examiner*—Harry N. Haroian
*Assistant Examiner*—Steven L. Stephan

[57] ABSTRACT

An audiovisual disc projector, accepting for audiovisual reproduction audiovisual discs having a stationary spiral sound track surrounding a stationary ring of projectable images, said disc projector including a rotating member carrying a sound transducer for the reproduction of the audio information of the sound track and a stationary projection-light source secured to a shaft passing through the turntable bearing.

9 Claims, 6 Drawing Figures

AUDIOVISUAL DISC PROJECTOR

FIELD OF INVENTION

This invention relates to audiovisual discs and projectors and in particular to audiovisual projectors accepting for reproduction discs incorporating and fully integrating a series of projectable images disposed in an annular ring surrounded by a spiral sound track.

DESCRIPTION OF THE PRIOR ART

Slide projectors, that is projectors accepting for projection still image transparencies or "slides," have been widely accepted as an entertainment, educational, advertising and, in general, information-storing and reproduction medium. It has been also widely accepted that the addition of "synchronized" sound greatly increases the usefulness and value of projectors of all kinds, whether they are of the "movie" or "still" variety.

The addition of synchronized sound to still images, or slides, always posed considerable technical difficulties and originally the sound was contained in a totally separate medium, such as a separate phonographic record or magnetic tape. It is evident that as long as two separate media were employed, "synchronization," in the accepted sense of the word, was impossible.

Several years ago, the inventor of the present invention solved the synchronization problem by associating a generous amount of audio information with each and every slide. In fact, according to the teachings of his U.S. Pat. Nos. 3,122,053, 3,122,054, 3,282,154, 3,302,520, 3,480,356, each and every one of his audiovisual tablets, of special construction and attributes, contains a stationary sound track, spirally disposed about a stationary, projectable, image.

In some cases however, it was found that this was not entirely satisfactory, and one single image and its associated sound was not sufficient, but instead, a series or sequence of projectable images with their accompanying sound was necessary. Accordingly, in his U.S. Pat. applications Ser. No. 500,753 and 500,754, the inventor of the instant invention taught the principles of an audiovisual disc incorporating a series of projectable images, disposed on an annular ring surrounding a spiral sound track, which also included special pulses for the step-like rotation of the disc, at the predetermined, desired, time intervals, in order to expose to the optical projection beam of a specially designed and constructed audiovisual reproduction apparatus, the individual images of the disc.

The arrangement of projectable images around a spiral track was dictated by technical considerations, such as the best use of the available space on the disc, consistent with the best disposition of the optical and audio components on the special audiovisual reproduction apparatus. It was later discovered that while the placing of the images around the sound track allowed a substantial area for each and every image (which, in turn, resulted in good, clear and sharp projections), it increased considerably the manufacturing cost of the audiovisual discs, since it was either necessary to have all images printed on a fairly large, and therefore expensive, photographic film, or, alternatively, each image, or group of images, had to be individually mounted on the special audiovisual disc, again a time-consuming and expensive operation.

OBJECTS OF THE INVENTION

It is therefore the object of the present invention to provide a special audiovisual disc incorporating a series of projectable images disposed on a stationary, annular ring surrounded by a stationary spiral audio track and also incorporating means for the step-wise rotation of the disc, in order to expose for projection individual images.

It is a further object to provide such a disc having its image and audio components arranged in such a manner that all images can be economically printed on a single medium, such as a photographic transparency, which may be easily affixed, or secured, to another sheet carrying the associated sound.

It is a further object to provide such a disc wherein both the images and their associated sound may be conveniently carried on a single medium, such as a special film.

It is still a further object to provide a novel audiovisual apparatus, of special construction and attributes, which accepts the above-referred discs and conveniently and economically reproduces both their audio and optical components.

It is a still further object of the instant invention to provide such audiovisual reproduction apparatus, which has its optical components and its audio-reproduction mechanism arranged in a novel and very convenient manner, wehreby considerable technical advantages may be obtained.

It is a still further object of the present invention to provide the novel audiovisual reproduction apparatus having its components arranged in a manner that makes possible its mass-manufacturing at greatly reduced cost.

Other objects of the invention will become evident from the ensuing description, illustrations and claims.

SUMMARY

An audiovisual disc incorporating a series of stationary, projectable images, all disposed in an annular region surrounded by a stationary sound track. An audiovisual apparatus accepting such an audiovisual disc and incorporating an optical projection system, at least part of which is stationarily secured to a shaft passing through a rotating member carrying the sound reproduction transducer.

DESCRIPTION OF A PREFERRED EMBODIMENT

The invention will now be described in some detail in connection with one specific embodiment thereof, chosen for its simplicity, but other, different, or more complex, versions and modifications are evidently possible within the spirit of the invention.

Figure 4:
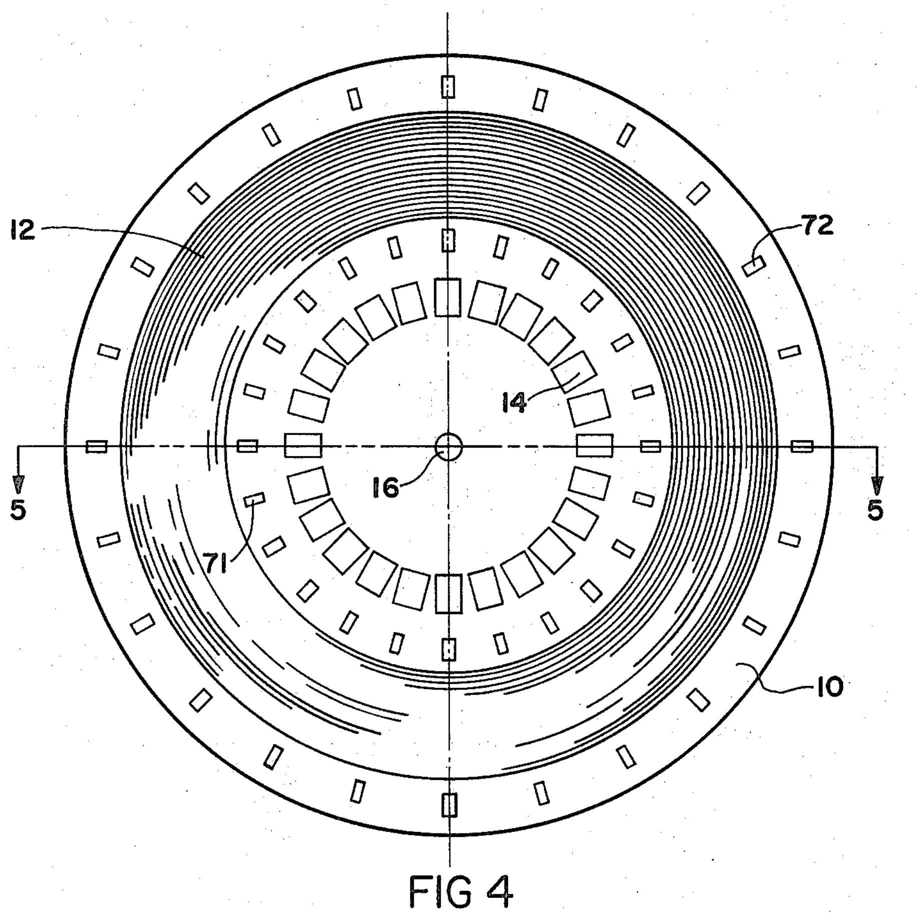
FIG.4 is a plan view of one of the preferred embodiments of an audiovisual disc according to the invention.

FIG. 4 illustrates an embodiment of an audiovisual disc according to the invention. The disc, generally designated by numeral 10 may be circular in shape and made of any convenient and appropriate material, and may be thick in cross section, or preferably thin, for reasons of economy. For example, it may be made of a thin plastic material.

Pressed, embossed, printed or otherwise arranged on it, disc 10 carries a spiral sound track 12, which may be of the phonographic groove type, or of the magnetic, the electrostatic, or of any other desired and convenient type. Arranged in an annular region, within this sound track 12, is a series of projectable images 14, for example projectable transparencies.

The disc may have, substantially in its center, the usual perforation or hole 16. It may also have a series of perforations, indentations or the like, employed by the reproduction apparatus for the step-wise rotation of the disc, in order to expose to the optical beam successive images 14. These perforations, indentations or the like, may be located in any convenient place on the disc, for example they may take the form of a series of perforations 71 or 72, disposed in an annular region concentric to center hole 16.

Numeral 20 designates the housing of the reproduction apparatus. Housing 20 may optionally have a cover 22, which, in turn, may be again optionally hingendly, or otherwise, attached to housing 20. Numeral 24 designates a hinge, if such hardware is chosen.

Plate 26 at, or near, the top edge of housing 20, is formed with a large opening 28, exposing turntable 30, which is rotationally arranged about the spindle or shaft 32, substantially in the phonographic art manner.

A sound transducer 42, may be mounted on arm 38, which, in turn, is pivotally attached in the usual phonographic manner to support means 36, mounted on the rotating turntable 30. Motor means (not shown), rotate the turntable 30, in the usual phonographic manner. Alternatively, the arm may be of the radial, pantographic or any of the several well known in the art types.

Figure 2:
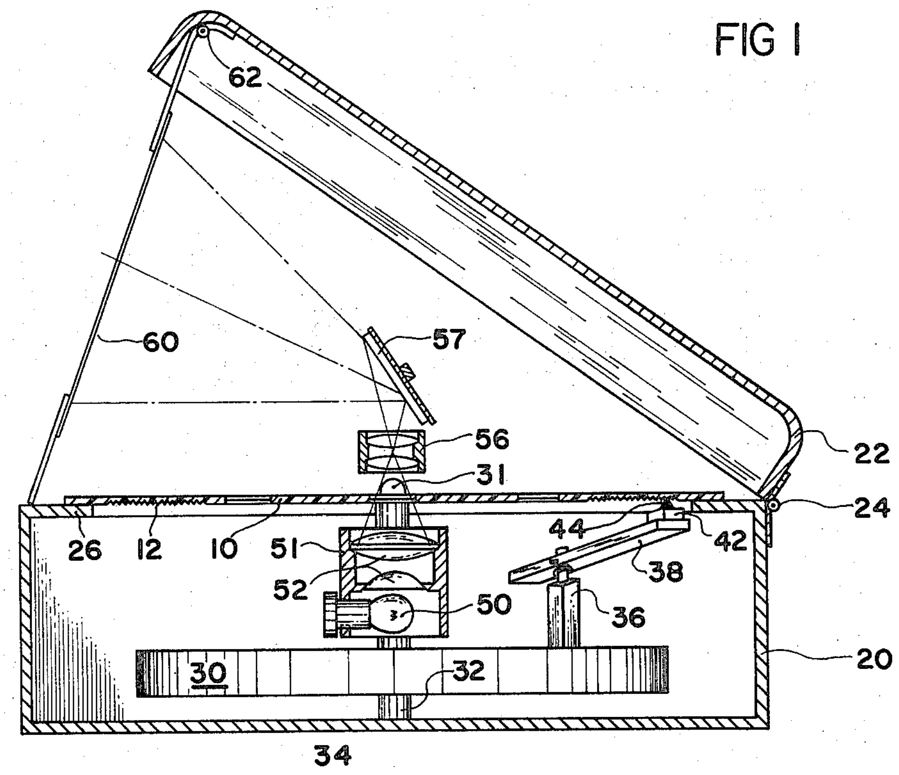
FIG. 2 is a vertical sectional view taken along line 2—2 of FIG. 1, with the cover and some parts added, but with some other parts and components missing.

An audiovisual disc of the type illustrated in FIG. 4 may be conveniently placed on, and supported by, plate 26, its center hole 16 passing through the tip 31 of turntable spindle 32. As shown in FIG. 2, the sound track 12 is facing the turntable, and is engaged in sound reproducing relation by the stylus 44, or the working end of the sound transducer 42.

An optical projection beam is conveniently and immovably secured to the turntable spindle 32, between the disc 10 and the rotating turntable 30. This may be best seen in FIGS. 2 and 3. For example, a condensing lens system collimates the rays of projection lamp 50, and illuminates image or transparency 14. The condensing lens system and lamp 50 are immovably secured on turntable spindle 32, for example by means of housing 51, secured to bracket 54, secured to turntable spindle 32.

A projection lens cell 56, supported by bracket 58, supported on plate 26, or otherwise directly or indirectly supported on housing 20, focuses on image or transparency 14, and projects its enlarged image on an appropriate viewing or projection screen, which in turn may, or may not, be a part of the apparatus.

The disposition of the optics and the screen may follow any convenient or desired arrangement, and as an illustration of the several possible variations, FIG. 2 shows a mirror 57 bending the rays and guiding them on screen 60, which may optionally be of the translucent, or, as it is generally called, "rear screen" type. This screen 60 may be hingendly supported on cover 22, for example by means of hinge 62, so that it may be conveniently folded inside cover 22 when the latter is closed or lowered on housing 20. The mirror 57 may also fold down, when not in use, and/or the cover 22 may be deeper in order to close over the mirror and projection lens. It is, of course, evident that the housing, the screen, etc., may take any convenient and desired shape and form, collapsible and folding as above described, or not.

As already stated, the audiovisual disc 10, may have appropriate perforations or indentations engageable with an appropriate mechanism on the reproduction apparatus (not shown), in order to rotate the disc in a step-like fashion, at desired intervals, in order to expose to the projection beam successive images 14. The triggering of this step-like rotation may be conveniently initiated from pulses contained in the sound track itself, which may be of the monoral or stereo type, and if it is of the latter, it may be convenient to employ one channel for audio and the other for the trigger pulses.

It has become evident from the description that one of the principal novel features of the invention is that the projection system, or a part of it, is secured immovably on the immovable turntable spindle. On the other hand, the sound transducer rotates about the axis of the sound track, and for this reason, the leads carrying the impulses from the transducer, may be conveniently connected to a slip-ring and brush assembly, secured to the turntable, in order to conduct these impulses to an appropriate electronic sound and impulse amplifying system, which may be housed within the housing of the apparatus or elsewhere.

It is evident that the sound track on the audiovisual disc, and the sound transducer of the apparatus, may be of any convenient type, such as phonographic, photoelectric, magnetic, etc.

It has been abovedescribed that the transducer-carrying arm 38 is pivotally secured to the turntable 30 in the usual phonographic manner, through an interconnecting spacer, or support means 36. Of course, this was done for illustrative purposes only and support means 36 is not essential, as a matter of fact a turntable, such as turntable 30, is not essential either, the only requirement being that the sound transducer 42 rotates about the axis of, and in sound-reproducing relation with, the spiral sound track of the audiovisual record. Any means that accomplish the above is equally acceptable, for example, the arm 38 may be supported on a simple link rotating about a shaft whose axis substantially coincides with the axis of the sound track. A turntable is nevertheless useful, because it conveniently supplies the rotational inertia necessary for the smooth rotation of the sound transducer. It is, of course, necessary to provide means for rotating the sound transducer or the turntable, but this may be accomplished by motor, gear, belt, idle wheel, etc., means, all very well known, in the art.

Figure 3:
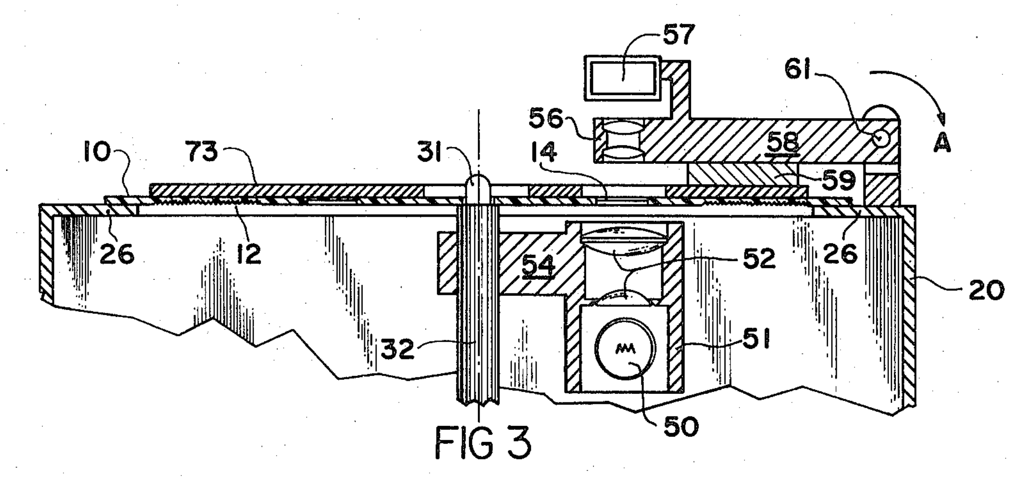
FIG. 3 is a vertical sectional fragmentary view taken along line 3—3 of FIG. 1, with several parts missing.

As already mentioned, the sound track remains stationary and for this reason, record-holding means must be provided to hold the sound record stationary while a particular image is being projected. On the other hand these record-holding means must be rendered inactive during the time interval required to step-wise move the record, in order to expose to the projection beam another image. There are many well-known means to accomplish the above, for example the weight of the disc itself may suffice, or a pressure plate or pressure pads may be conveniently employed over the disc. A pressure plate or pressure pads have the distinct advantage that while they can hold the disc immovable, they will also allow it to rotationally "slip" under the influence of the mechanical means that step-wise rotate the disc. As an example of the several possible forms that the abovedescribed holding means may take, a pressure plate 73 is illustrated in FIG. 3. This pressure plate 73 may be optionally secured to member 58, for example by means of spacer 59, in which case, it may be convenient to hingendly support member 58, for example by pin means 61, so that the entire assembly of member 58 and pressure plate 73 may be lifted away from the audiovisual disc, in the direction of arrow A, thus facilitating the insertion and removal of the audiovisual disc in and out of its playing position in the apparatus. It must be again emphasized that the abovedescribed holding means, i.e., the abovedescribed pressure plate 73 and the method illustrated to interconnect it with the apparatus are only specific examples of holding means, and other methods and forms of holding means may be used within the spirit of the invention.

And again, the mechanical (or electro-mechanical) means employed for the step-wise rotation of the disc are well known in the art, for example reciprocating links, or intermittently rotating wheels, provided with teeth engaging perforations such as 71 and 72 may be conveniently employed.

One single layer of material, for example a plastic material, may have on it both the images and the sound track, or the sound track and the images may be carried on more than one layer. For example, it may be convenient to have on one single plastic layer, a phonographic record imprinted and the images printed, in the photographic transparencies fashion, or otherwise. On the other hand, it may be preferable to have all the images printed, or carried, on one single layer of material, which is then bonded, cemented or otherwise affixed to the sound track carrying layer.

Figure 5:
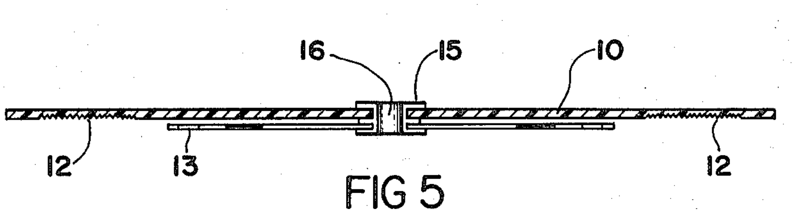
FIG. 5 is a cross-sectional view of another, different, embodiment of an audiovisual disc according to the invention, the view corresponding to a cross-section taken along line 5 — 5 of FIG. 4.

When two separate layers are employed, it may be more convenient to step-wise rotate only the image-carrying layer. This has the advantage that there will be no interruption or deterioration of quality of the sound or music while the image-layer is being step-wise rotated. This possible arrangement is illustrated in FIG. 5, where numeral 10 denotes the sound track layer and 13 the image layer. These two layers may be both disc-shaped and bearingly interconnected, for example by means of a hollow bearing 15, which allows free rotation of one layer with respect to the other. It is evident that layer 10 must have a transparent area or a window at least over one projectable image.

Figure 1:
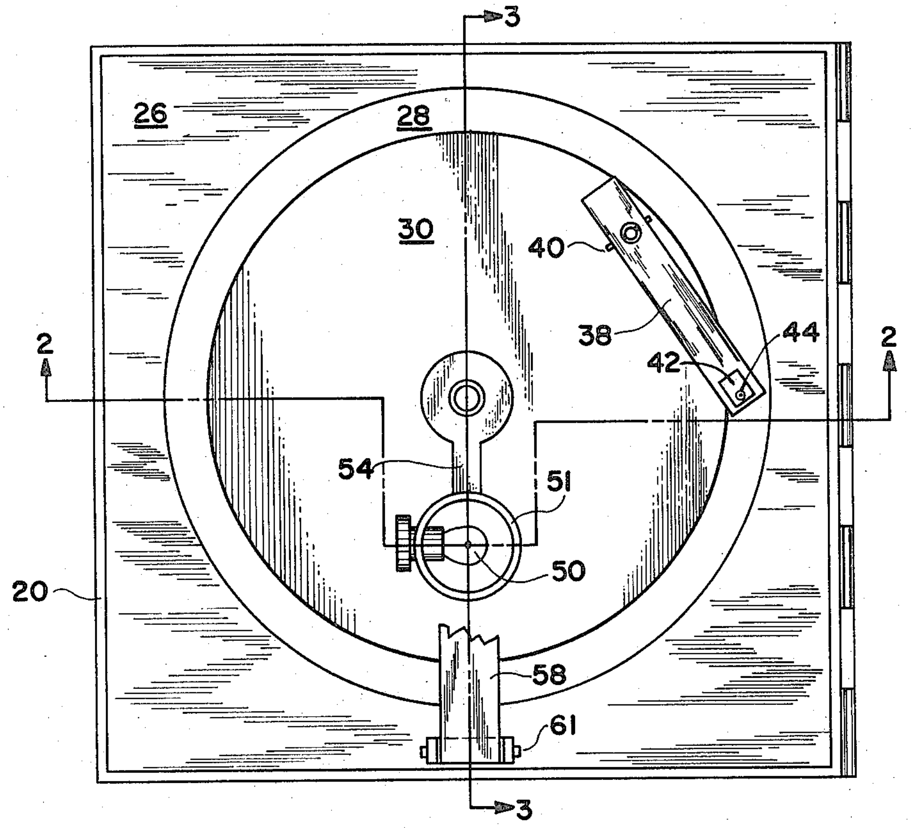
FIG. 1 is a plan view of the apparatus with the cover, the projection lens and some parts removed.
Figure 6:
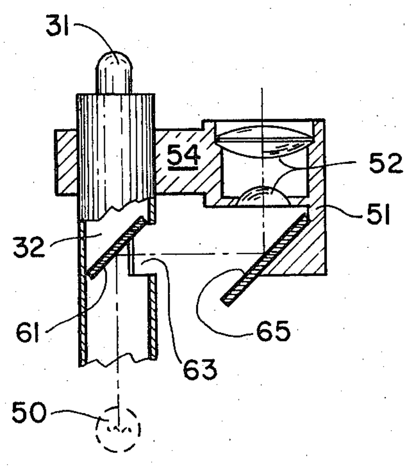
FIG. 6 is a vertical, partly sectional, view of an alternative embodiment of the turntable spindle and beam-guiding and directing means, according to the invention.

While specific embodiments of the invention have been disclosed herein, it will be understood that various modifications and variations, within the spirit of the invention, may occur to those skilled in the art, thus, in the final analysis, the projection beam source and its beam-directing means (for example lamp 50 and condensing lenses 52), do not have to be secured on the turntable spindle 32, but the turntable spindle 32 may be a hollow spindle through which freely passes a projection beam. Inside this hollow spindle a mirror or prism bends the beam (for example by 90) and directs it through a window (or opening) arranged on the wall of the spindle and onto another mirror or prism (secured on a bracket which is, in turn, held on the spindle in a fashion equivalent to the way bracket 54 holds housing 51), which second mirror or prism bends again the beam (for example, again by 90) to direct it onto an image 14. This arrangement is particularly advantageous because it permits placing the turntable 30 considerably closer to the audiovisual disc 10 (which greatly simplifies the construction) and also this arrangement facilitates the incorporation into the apparatus of cooling means (for example fans or blowers) for cooling the projection beam source. A simple embodiment of the abovedescribed alternative arrangement is illustrated in FIG. 6, in which the radiation beam source 50 directs its beam through the hollow turntable spindle 32 and onto mirror 61 which bends the beam and directs it through opening or window 63, formed on the wall of spindle 32, and onto mirror 65 which bends and guides the beam onto image 14. The mirror 65 (as well as optional condensers, such as condensing lenses 52) held by housing 51, are secured to bracket 54 which is, in turn, secured to hollow spindle 32. It is evident that the abovedescribed, as illustrated in FIG. 6, will take the place of the equivalent assembly in the apparatus illustrated in some detail by FIGS. 1, 2 and 3.

Also it must be emphasized that other then purely "optical images" or other than visible to, or recognizable by, the naked eye images may be employed, and the optical (or equivalent) elements in the apparatus will be appropriately modified, within the spirit of the invention.

The information (sound) track may also be of any desirable type, such as phonographic, magnetic, optical, etc., and the scanning transducers will be of the appropriate type, i.e., capable of sensing the particular sound track employed.

For these reasons, while the term "projectable images 14" has been employed for descriptive purposes, it must be understood that any visually-reproduceable imaging information may equally well be employed and this information will then be converted into an image by the appropriate radiation beam or any other suitable electronic, optical, electro-optical, etc., device placed in the apparatus of the invention.

What is claimed is:

1. An audiovisual apparatus accepting for audiovisual reproduction an audiovisual record having a series of images arranged within an annular region surrounded by a spiral sound track, said apparatus including:

a. record-supporting means for supporting said record during its audiovisual reproduction, said record-supporting means arranged to leave said track substantially exposed to a rotating transducer which engages and follows said track in a sound-scanning relationship;

b. shaft means disposed on said apparatus, said shaft means having a longitudinal axis which substantially coincides with the axis of rotation of said transducer;

c. source-means emitting a ratiation beam and beam-guiding means directing said radiation beam onto at least one of said images, at least one of the last-named means supported on said shaft means and being at a distance away from said axis of rotation;

d. said transducer secured to a rotating member which is mounted for rotation on bearing means disposed around said shaft, at least one of said last-named means being disposed between said record and said bearing means.

2. Apparatus according to claim 1 wherein said shaft means include a spindle engaging a hole in said record.

3. Apparatus according to claim 1 wherein said radiation beam is a projection-light beam.

4. An audiovisual apparatus according to claim 1 wherein said rotating member is a turntable.

5. An audiovisual apparatus according to claim 1 wherein said transducer is first mounted on an arm and said arm is in turn mounted on said rotating member.

6. Apparatus according to claim 1 wherein a projection-lens system is focused on at least one of said images to project them onto a projection screen.

7. An audiovisual apparatus according to claim 6 wherein said projection screen is mounted on said apparatus.

8. An audiovisual apparatus according to claim 1, including holding means engageable with said record for holding said record immovable during the optical projection of its images, but allowing at least a portion of said record to rotate at desired time intervals in order to expose to said radiation beam successive images.

9. Apparatus according to claim 1 wherein said shaft means include a hollow shaft through which passes said radiation beam, said shaft formed with a window and having therein beam-bending means which bend said radiation beam and direct it through said window onto said beam-guiding means which once more bend said beam and thereby direct it onto at least one of said images.

* * * * *